(12) United States Patent
Saliba

(10) Patent No.: US 7,440,212 B2
(45) Date of Patent: Oct. 21, 2008

(54) METHOD AND SYSTEMS FOR A HIGHLY ERROR TOLERANT TAPE FORMAT

(75) Inventor: George A. Saliba, Northborough, MA (US)

(73) Assignee: Quantum Corporation, San Jose, CA (US)

( * ) Notice: Subject to any disclaimer, the term of this patent is extended or adjusted under 35 U.S.C. 154(b) by 194 days.

(21) Appl. No.: 11/206,485

(22) Filed: Aug. 17, 2005

(65) Prior Publication Data

US 2007/0041117 A1 Feb. 22, 2007

(51) Int. Cl.
*G11B 5/09* (2006.01)

(52) U.S. Cl. .......................... 360/53; 360/66; 360/72.1

(58) Field of Classification Search .................. None
See application file for complete search history.

(56) References Cited

U.S. PATENT DOCUMENTS

| | | | |
|---|---|---|---|
| 4,783,784 A * | 11/1988 | Ishiguro et al. | 714/5 |
| 5,841,600 A | 11/1998 | Kaplan | |
| 6,067,481 A | 5/2000 | Saliba et al. | |
| 6,266,201 B1 | 7/2001 | Dahlerud et al. | |
| 6,426,928 B1 | 7/2002 | Russell | |
| 7,085,086 B2 * | 8/2006 | Kimura | 360/53 |
| 2003/0123175 A1 * | 7/2003 | Gill et al. | 360/53 |
| 2005/0066112 A1 * | 3/2005 | Osakabe et al. | 711/103 |

* cited by examiner

*Primary Examiner*—Andrea Wellington
*Assistant Examiner*—Varsha A. Kapadia
(74) *Attorney, Agent, or Firm*—Morrison & Foerster LLP

(57) ABSTRACT

Described herein are media drives for writing information to a media (e.g., a tape media), systems for storing information on a storage medium, and methods of writing information to a media. The devices, systems and methods described herein are error tolerant in that they may permit only a limited number (or arrangement) of bad blocks in an envelope to be written before they erase at least a portion of the envelope that has already been written, and move to a different region of the storage media and re-write the envelope.

15 Claims, 9 Drawing Sheets

| 401 Envelope A | 402 Envelope B | 405 Envelope C | 420 Defective Region | 409 Envelope D | 415 Unwritten |

FIG. 4A

| 401 Envelope A | 402 Envelope B | 420 Defective Region | 405 Envelope C | 409 Envelope D | 415 Unwritten |

FIG. 4B

METHOD AND SYSTEMS FOR A HIGHLY ERROR TOLERANT TAPE FORMAT

BACKGROUND OF THE INVENTION

1. Field of the Invention

The present invention generally relates to devices, systems, and methods for storing information on an information storage medium, and particularly to writing envelopes of information to a storage media so as to minimize the effect or number of invalid blocks of information.

2. Related Art

Information storage media devices, such as magnetic tape media, are used by computer peripheral devices to store and record data. In particular, linear data tape is one variety of storage media that may be read and/or written as the linear data tape streams past a head assembly. Tape moves past the head assembly in both a forward or reverse direction, and one or more "tracks" of information are recorded or read from the tape in a direction that is parallel with the direction of the movement of the tape.

A media drive may be used with a storage medium. Media drives typically include a head assembly to write and/or read information to a storage media. A head assembly (e.g., a transducer head assembly) may include multiple heads that are laterally adjacent to each other. The head assembly may also include adjacent "read" and "write" heads. For example, writing to a storage media may be confirmed by a "read" head that reads the storage media as (or immediately after) it is written. The storage media is typically organized so that it can interact with the head assembly. According to one format, physical tracks may be grouped according to bands, channels and logical tracks. A physical track is the area transversed on the tape medium by a transducer head at a particular lateral position. Physical tracks laterally adjacent to each other and traversed by the same transducer head at different lateral positions within a band are associated with the same "channel." (For the sake of convenience, we will sometimes refer herein to a head operating within a band as a "channel.") For example, multiple physical tracks written by one head in the same direction may be laterally adjacent to each other as a group, followed by another set of physical tracks associated with another channel. A head can step laterally to write physical tracks within a band, but stops before it reaches a track written by the next adjacent head in the head assembly, to avoid overwriting the track written by the next adjacent head. The group of physical tracks associated with a channel corresponds to a "logical track." Unless otherwise indicated herein, any reference to a "track" refers to a physical track. All the adjacent physical tracks traversed in one direction by all transducer heads in a head assembly represent a "band."

The media drive (e.g., a tape drive) receives data from the computer or data processing system. The information is typically formatted (e.g., by a formatter) into a sequence of blocks that may be recorded into tracks. Blocks may be data blocks (e.g., containing user data), error correction code ("ECC") blocks, information blocks (e.g., containing metadata, such as filemarks, directories, Dmarks, etc.), or combinations thereof. Typically, each block also contains additional information such as a preamble, a header, a postamble (including ECC information). For example, blocks typically include a block number or block address assigned by the formatter. Blocks may be recorded (written) to the tape in a sequential manner. Blocks are typically the smallest elements of information that are read and written. Each block is written by a single head with an unwritten gap between the blocks.

Blocks of information may be organized in any appropriate format so that they can be accurately read and written to the tape media by a head assembly. Blocks may also be organized into an entity, which is a group of blocks that is protected by error correction codes (ECC). Furthermore, multiple entities may be combined to form an envelope. Envelopes can include one or more entities, and can be written to the storage media at the same time. A formatter may also organize blocks of information into an envelope. A media drive generally writes each envelope of information (consisting of blocks of information) sequentially to the storage media. For example, the media drive may organize information (e.g., user data, error correction codes, metadata, etc.) into blocks, and then write the blocks as one or more envelopes onto the storage medium. Thus, envelopes may be sequentially written to the storage medium.

During the writing of each envelope of information to a storage medium, the media drive typically verifies that each block that is written was correctly written. For example, when writing to a linear tape, the drive verifies that both the block content (CRC) and the vertical position of the block (PES) were correctly written (e.g., using a read-after-write technique). The media drive can apply a variety of rules (or logic) to determine if the block is accurate or not. A block is repeatedly written until it has been accurately recorded. Writing of an envelope is not completed and closed until all of the blocks of the envelope have been accurately written. Thus, an envelope may contain a predefined amount of information; however, the number of blocks (and thus the size of the envelope) that is written to a given storage medium may vary. The more defects that a storage medium contains, the larger the envelope will be. Invalid (or erroneous) blocks of information are not erased, and typically cannot be marked as invalid, because the read head that verifies the block accuracy lags the write head (e.g., the block is read for accuracy verification after it has already passed beyond the write head). Various techniques known as back link techniques and k-bit (or kill bit) techniques may be used to mark or otherwise map the bad blocks. Marker reference signals indicating "bad blocks" may still present a problem, because in some cases the bad block still exists, and there is a finite probability that (over time and a number of permutations) the bad block or reference marker can be "misinterpreted" by some drive reading the storage medium.

One of the principle causes of errors in writing blocks to a storage medium is defects in the storage medium itself. For example, a magnetic tape medium typically comprises a thin film of magnetic material that stores the data. The tape medium may be moved past a head assembly so that information may be written or read to the tape. Defects in the storage medium may have been created during the original manufacture and assembly of the storage device, or they may have developed at a later point. One common defect in tape media is non-magnetic regions on the tape, where the magnetic coating is not applied with adequate thickness or is applied with protrusions on the surface of the medium (e.g., roughness), causing a loss of signal due. Another very common cause for errors is the temporary separation between the tape and the transducer head. Temporary separation between the tape and a head of the head assembly is particularly troubling when a read head is separated, preventing the drive from confirming that a write or erasure has succeeded or failed. Thus, a "good" block may be mistakenly considered a "bad" block, resulting in what is referred to as a ghost block. For example, the read head may be temporarily separated from a tape media during a read-after-write verification, but the but the write head does contact the tape, and so a block is correctly written (although the verification has failed), causing the block to be considered "bad," and be re-written. This results in two "good" copies that may both be read by a media drive (although a record of the ghost copy may be retained). In some cases, even procedures to erase (or "kill") duplicate ghost blocks may not be successful, because such blocks may not be easily erased, or the tape separation problem may prevent erasure or confirmation of erasure.

Ghost blocks (duplicate data) represents a problem that the drive (and storage media) must address in order to accurately store and retrieve data. Bad blocks (including ghost blocks) must be detected and removed from the envelope. Generally, to remove or filter ghost blocks from an envelope of blocks that include ghost and real blocks (e.g., logical envelope blocks), the entire envelope is typically loaded into a memory (e.g., a drive envelope memory) and a "hashing" type check is done to verify various attributes so that a decision can be made about what blocks belong to the envelope and which blocks do not belong. Blocks that have been successfully erased may not be included in this process, however "ghost" blocks may be included. Thus, the size of the envelope that was actually written to the media (the logical size plus ghost blocks) must fit into the memory. If the size of the envelope exceeds a threshold (e.g., determined by the size of the drive memory and/or processor speed of the drive), the media drive may declare a hard write error (or a fatal error). Furthermore, the presence of bad blocks (e.g., ghost blocks or out-of-date blocks) also requires complicated systems to distinguish good blocks from bad blocks. Existing media drives must carefully limit the number of allowable re-writes to protect the integrity of information stored on the storage media. Since bad blocks are often intermixed with good blocks, media drives must be able to accurately avoid the bad (e.g., ghost) blocks, while accessing the good blocks.

Thus, it is desirable to provide more error-tolerant devices, methods and systems for writing information to a storage medium which may address some of the problems identified above.

SUMMARY OF THE INVENTION

Described herein are media drives for writing information to a media (e.g., a tape media), systems for storing information on a storage medium, and methods of writing information to a media. The devices, systems and methods described herein are error tolerant in that they may permit only a limited number (or arrangement) of bad blocks (bad blocks may include ghost blocks) in an envelope to be written before they erase the portion of the envelope that has already been written, write blocks of the envelope to a different region of the storage media, and re-write at least a portion of the envelope (e.g., the portion of the envelope that was confirmed erased from the first region of the storage medium). Thus, the entire envelope may be shifted (rewritten) or only a portion of the entire envelope may be rewritten. For example, the blocks that cannot be confirmed erased may remain where they are on the storage medium, and the rest of the envelope is written to a different region. As long as the total number of blocks written (including ghost blocks) minus the number of blocks confirmed erased is less than the number of blocks available for holding the envelope in the drive envelope memory, the envelope can be deciphered (e.g., any ghost blocks can be filtered out).

For example, an error tolerant tape media drive for writing information to a tape media may include a drive envelope memory for storing an envelope. An envelope typically comprises blocks of information (e.g., data, ECC, metadata, etc.), and thus the drive envelope memory may be described in terms of "blocks" of information that it may hold. The drive envelope memory is typically larger than an envelope read or written by the drive. For example, the drive envelop memory may have more blocks of memory than then number of blocks in a logical envelope (a logical envelope is an envelope consisting of only "good" blocks, without any bad blocks). The error tolerant tape media drive may also include a transducer head for writing information on a tape media. Finally, the error tolerant media drive generally includes envelope writing logic operable to determine a written envelope size value as the envelope blocks are written to a first region of the tape media. The envelope writing logic may cause the envelope to be erased from the first region of the tape media and the erased portion of the envelope to be rewritten at a second region of the tape media if the written envelope size exceeds an envelope window threshold. The tape media drive may also include a motor for controlling the position of the tape media.

Any appropriate way of erasing a block may be used, including overwriting all or a portion of the block, or setting the ECC of a block to be invalid. In some cases, the drive may not be able to confirm that the block has been erased, or the drive may be unable to erase a block. For example, a read or write head of the transducer head may be temporarily out of contact with the media. The envelope writing logic may monitor when a block can be confirmed (or cannot be confirmed) to have been erased. As described more fully below, erasure of the envelope may be an incomplete erasure if some of the blocks cannot be confirmed erased.

The written envelope size may be any value that indicates (either directly or indirectly) the number of bad blocks (including ghost blocks) written to the tape media as part of the envelope. Thus, the written envelope size may include the number of blocks for which erasure was not confirmed. Since blocks for which erasure cannot be confirmed may be part of the envelope (and can be filtered from the final envelope when the envelope is read into the drive envelope memory by various drive heuristics), blocks that are unconfirmed erasures may contribute to the size of the envelope written to the media. In some versions, the written envelope size indicates the total size of the envelope that has been written. Thus, the size of the envelope that has been written also includes the bad blocks. In some variations, the written envelope size indicates the number of bad blocks that have been written (or the number of blocks rewritten) and may include the number of blocks for which erasure could not be confirmed. In some variations, the written envelope size may include weighted values. For example, the written envelope size may be incremented by different values depending on the arrangement of the bad blocks (e.g. the proximity of bad blocks to other bocks, including other bad blocks). In some variations, the written envelope size indicates the total number of "good" blocks in the complete envelope (e.g., the ideal or "logical" envelope size) plus the number of bad blocks that have been written (e.g., the actual count of bad blocks), plus the number of blocks for which erasure could not be confirmed (including unconfirmed erasures from previous attempts to write the envelope.

Envelope writing logic may compare the envelope window threshold size to the written envelope size. Thus, the envelope window threshold size may be any threshold appropriate for comparison to the written envelope size. For example, the envelope window threshold may be a maximum number of bad blocks (e.g., ghost blocks) or the size of the logical envelope plus a maximum number of ghost blocks. In some variations, the envelope window threshold may be based on the percentage of the envelope that consists of bad blocks (e.g., the envelope window threshold is 5% greater than the actual envelope size, 10% greater than the actual envelope size, 15% greater than the actual envelope size, 20% greater than the actual envelope size, etc.). In general, the envelope window threshold is based on the size of the drive envelope memory. For example, the envelope window threshold may be any value that is less than the drive envelope memory and larger than the size of the logical envelope. As mentioned above, the size of the logical envelope is the minimum size of the ideal envelope (e.g., an envelope comprising only valid (good) blocks).

When the envelope writing logic causes the envelope to be re-written (e.g., when the written envelope size is greater than or equal to the envelope window threshold size), the envelope may be rewritten at a second region of the tape media that does not overlap with the first region of the tape media. The first region of the tape media is the region of the storage medium where the envelope was being written before the envelope writing logic detected that the written envelope size equaled or exceeded the envelope window threshold size. The envelope writing logic may cause the envelope to be rewritten at a second region of the tape media that is adjacent to the first region of the tape media. When blocks of the envelope cannot be erased or cannot be confirmed erased, the blocks that are not confirmed erased are left as part of the envelope, and the rewritten envelope is appended to the unerased blocks.

Also described herein are information storage systems for storing information on a storage medium. The system may include a drive envelope memory operable to hold an envelope, a transducer head to read or write to the storage medium, a motor operable to position the storage medium with respect to the transducer head, and a controller that controls the transducer head and the motor. The controller includes envelope writing logic that is operable to determine a written envelope size as an envelope of information is written to a first region of the storage medium, and further operable to cause the envelope of information to be erased and the erased portion (e.g., the portion confirmed erased) rewritten at another location on the storage media if the written envelope size exceeds an envelope window threshold.

Also described herein are methods of writing information to a tape media. The method may include the steps of determining a written envelope size as the envelope (comprising blocks of information) is written to a first region of the tape media, and triggering an erase of the envelope from the first region of the tape media and moving the successfully erased blocks of the envelope to a second region of the tape media when the written envelope size exceeds an envelope window threshold.

In some variations of the method, the written envelope size is the number of bad blocks written to the tape media plus the number of blocks that were not confirmed erased. The step of erasing the envelope of information may include the steps of moving the tape media to the beginning of the first region, reading and erasing the envelope blocks written in the first region, and confirming that each block was erased. The method of writing information to a tape media may also include advancing the tape media to the second region of the tape media, and writing the information in the envelope to the second region of the tape media.

The step of advancing the tape media to the second region may include advancing the tape media so that the second region does not overlap with the first region. In some variations, the step of advancing the tape media to the second region includes advancing the tape media so that the second region abuts the first region.

BRIEF DESCRIPTION OF THE DRAWINGS

FIGS. 4A and 4B show block diagrams of storage media tapes having envelopes of different sizes.

DETAILED DESCRIPTION OF THE INVENTION

Figure 1:
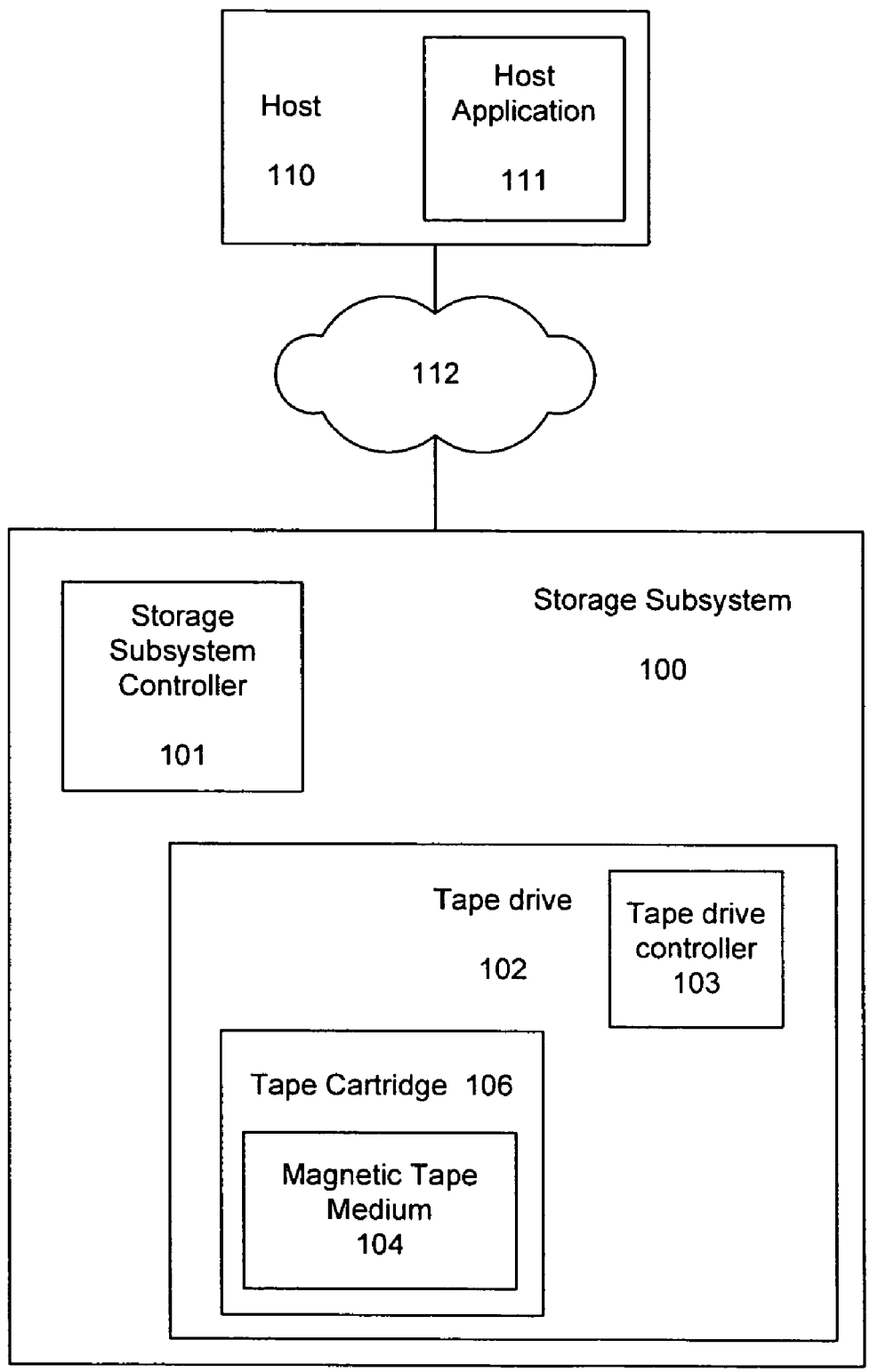
FIG. 1 shows a tape storage subsystem.

In the following description, reference is made to the accompanying drawings which illustrate variations of the present invention. Descriptions of specific devices, systems, techniques and applications are provided only as examples. Various modifications to the examples described herein will be readily apparent to those of ordinary skill in the art, and the general principles defined herein may be applied to other examples and applications without departing from the spirit and scope of the present invention. Thus, the present invention is not intended to be limited to the examples described herein and shown, but is to be accorded a scope consistent with the claims.

Some portions of the detailed description which follows are presented in terms of procedures, steps, logic or logic blocks, processing, and other symbolic representations of operations on data bits (blocks, entities, envelopes, etc) that can be performed on computer memory. Procedures, computer executed steps, logic or logic blocks, processes, etc., are here conceived to be a self-consistent sequence of steps or instructions leading to a desired result. The steps are those utilizing physical manipulations of physical quantities. These quantities can take the form of electrical or magnetic signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Described herein are devices, systems, and methods for writing information to a storage medium. In particular, the devices, systems and methods may allow error tolerant writing of information to a storage media. As used herein, the term "information" may refer to any type of information, including user data, error correction code information, metadata (e.g., information about the data itself), or the like. Any appropriate storage media may be used with the devices, systems, and methods described herein. For example, magnetic, optical, and electronic storage media may be used. Although the examples provided herein describes mostly linear tape media, the devices, methods and systems may be used with disc media (e.g., magnetic disc media, optical discs, etc.), other kinds of tape media (e.g., optical tape media), and electronic media (e.g., EEPROM, etc.).

The error-tolerant tape media drives described herein generally include at least one transducer head, and envelope writing logic. The envelope writing logic may monitor the size of the envelope being written, or the number and/or the position of bad blocks within an envelope as the envelope is written to the storage media, and can use this information to shift the envelope away from a region of a storage media having defects. The envelope writing logic may also cause the envelope to be erased from the original position so that multiple copies of blocks (including any bad blocks) are not left behind.

In some variations, the highly error tolerant tape drives may be part of a storage subsystem. Storage subsystems, such as magnetic tape libraries, are widely used for storing information in digital form. An exemplary tape storage subsystem 100 is shown in FIG. 1. This tape subsystem 100 may include a storage subsystem controller 101 for controlling one or more tape drives 102 contained within the storage subsystem 100 and for controlling other components of the storage subsystem 100, such as the tape picker, which is used to select and load tape cartridges 106 into the tape drives 102. The storage subsystem 100 may be coupled to a host system 110 running a host application 111, which transmits I/O requests to the storage subsystem 100 via a host/storage connection 112.

The tape media drive 102 reads and writes information to the data storage medium, shown in FIG. 1 as a tape medium 104. The tape medium 104 is contained within a data storage device, shown in FIG. 1 as a removable magnetic tape cartridge 106. As described above, the tape medium may be moved between a pair of reels and past a data transducer to record or read back information. In one type of tape media drive, one of the reels is part of the tape drive 102 while the other reel is part of the removable tape cartridge 106. For this type of tape drive system, the reel that is a part of the tape drive 102 is commonly referred to as a take-up reel, while the reel that is a part of the tape cartridge 106 is commonly referred to as a cartridge reel. Upon insertion of the tape cartridge 106 into the tape drive 102, the tape medium 104 on the cartridge reel is coupled to the take-up reel of the tape drive 102. Prior to removing the tape cartridge 106 from the tape drive 102, the storage tape 104 is rewound onto the cartridge reel and is then uncoupled from the take-up reel. In another variation of the tape media drive, the data storage tape device is a tape cassette that contains both reels. The tape media drive may therefore include a motor for moving and positioning the tape media (e.g., with respect to the head(s) of the head assembly).

Figure 2:
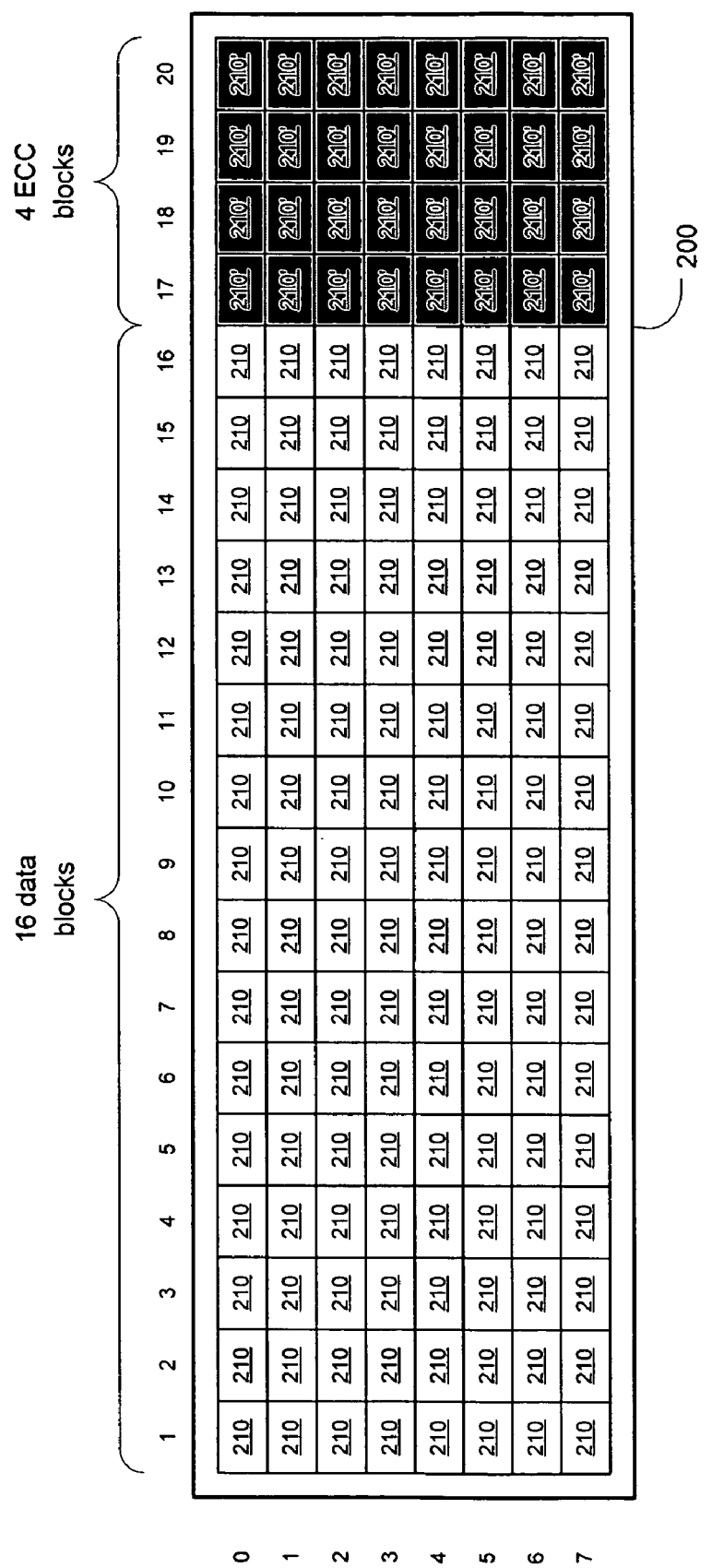
FIG. 2 shows a block diagram of an exemplary envelope of information that may be used with the devices, systems and methods described herein.

A tape media drive may store information on the tape medium in the form of blocks of data. FIG. 2 shows an envelope 200 comprising a plurality of blocks 210. Each block 210 may comprise, e.g., a data block corresponding to data received from the host application 111 or an ECC block 210', corresponding to an error correction code for the data blocks received from the host application 111. A group of blocks 210 may be grouped and treated as a logical unit (e.g., an entity 220). A group of entities may be part of an envelope 200. FIG. 2 shows an envelope that is comprised of 8 entities, numbered 0 through 7. Each entity shown in FIG. 2 comprises 16 blocks of data and 4 blocks of error correction code (ECC). Each vertical column of blocks 210 in the envelope 200 may be referred to as a stripe. Thus, the array of blocks 210 comprises eight rows of entities 0-7 and twenty columns of stripes 1-20, with the first sixteen columns comprising data blocks and the last four columns comprising ECC blocks.

In some variations, the individual blocks 210 of data may be reordered within the envelope 200 so that the blocks 210 need not be stored on the tape medium in sequential order. The blocks 210 within an envelope 200 may be tagged with control fields identifying the particular data envelope 200 in which the blocks 210 are contained. In this manner, the envelopes 200 may be sequentially ordered on the tape medium while the blocks 210 within each envelope 200 may be ordered in any fashion desired (e.g., sequential, random, ordered, or some other pseudo-ordered arrangement). Each of the rows 0 through 7 can represent a channel where data is written by a single head. The data from each entity can be interleaved in a checkerboard fashion across these channels so that the loss of a channel minimizes the number of data blocks from that entity that will be lost on a subsequent read of that data. The envelopes 200 may include from one up to any number of entities. In the embodiment shown in FIG. 2, the entities comprise data blocks and ECC blocks of substantially uniform size. In other variations, it is possible for the entities to not include ECC blocks and/or to utilize blocks of non-uniform size.

Figure 3:
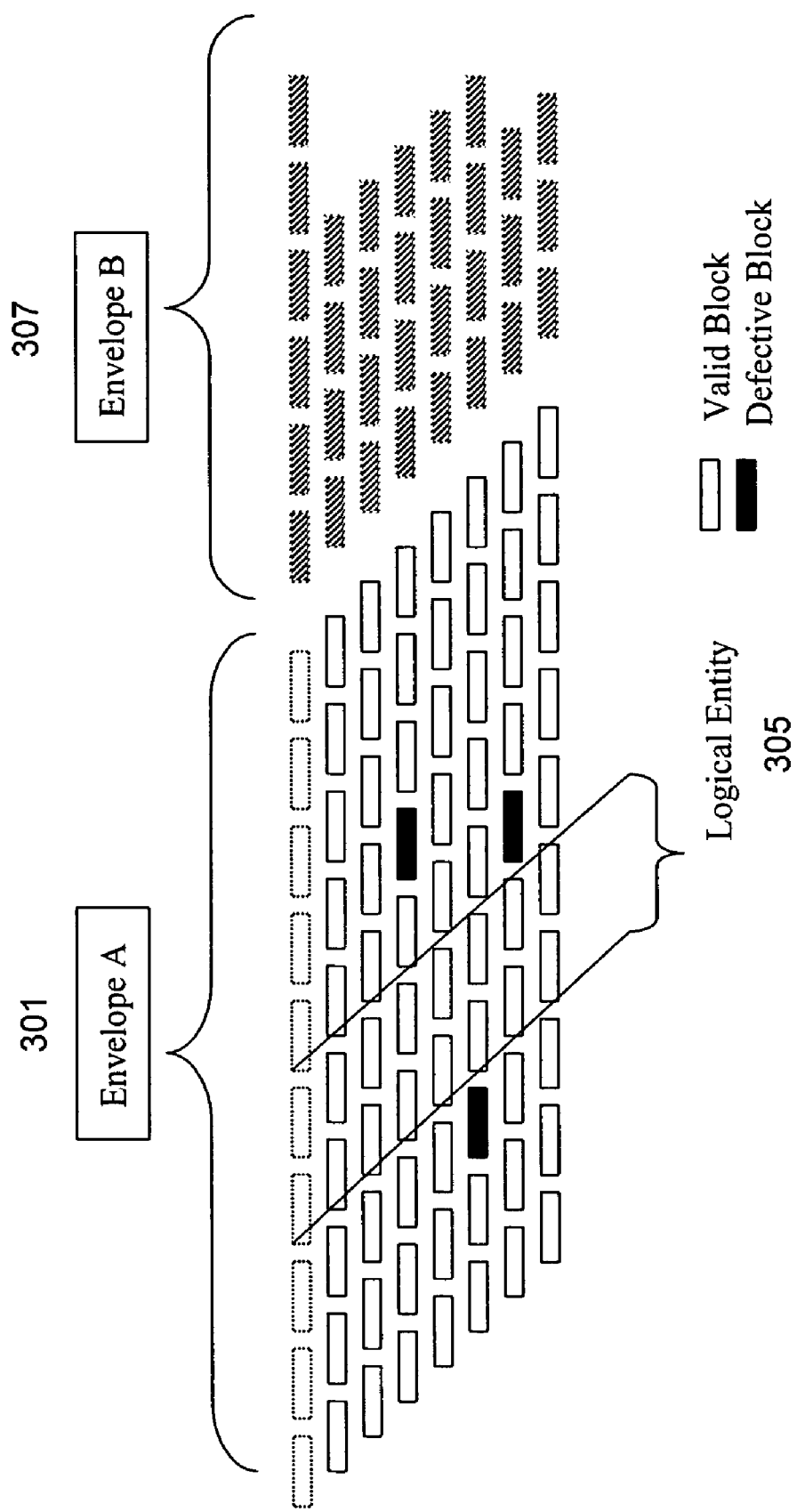
FIG. 3 shows a block diagram of another exemplary envelope of information that may be used with the devices, systems and methods described herein.

FIG. 3 shows another variation of envelope format. Envelope A 301 includes rows of blocks, and entities are arranged in columns forming different entities 305. In FIG. 3, it is apparent that bad blocks are included within the region of the storage media encompassing the envelope 301. Thus, different envelopes 307 may be different sizes. FIGS. 4A and 4B show regions of a storage media 400 (shown here as a linear tape media) that have envelopes of different sizes (e.g., Envelope A 401, Envelope C 405), including defective regions 420 or regions having bad blocks. The defective regions may be bounded (e.g., may have a marker indicating the start and finish of the defective region, as described in U.S. patent application Ser. No. 10/923,443, incorporated by reference above). The differently sized envelopes shown in FIGS. 4A and 4B may arise because the envelopes have some defective blocks. Thus, Envelope C 405 in FIG. 4B is larger than the other envelopes because it contains numerous bad blocks.

In some variations, the tape drive controller 103 receives information from the host application 111 and generates a corresponding ECC. The tape drive controller 103 may further group the data blocks and ECC blocks (and any information blocks) into entities and, in turn, organize the entities into envelopes to be written to the storage media. In other variations, the generation of ECC and grouping of data may be performed by other components, such as the storage subsystem controller 101 or the host application 111.

In general, information is written to the storage media in blocks until an envelope has been written, and completed. Information may be written to an information storage medium by an information storage system. An information storage system generally includes a media drive (e.g., a tape media drive), and may include additional components (e.g., motors, memory, controllers, etc.) for control and operation of the reading and writing of information to a storage medium. As each block is written, the information storage system verifies that the information in each block was correctly written. When a block of information is not successfully written, it is re-written in a subsequent block on the storage medium. Examples of this and similar block writing processes may be found in U.S. Pat. No. 5,841,600 to Kaplan, U.S. Pat. No. 6,426,928 to Russell, and U.S. Pat. No. 6,266,201 to Dahlerud et al., and U.S. patent application Ser. No. 10/923,443 (filed Aug. 20, 2004, and titled "BOUNDING DEFECTIVE REGIONS OF A TAPE STORAGE MEDIUM"). All of these patents and patent applications are herein incorporated by reference in their entirety.

As described above, an envelope written to a storage medium may include bad blocks. When the number and/or organization of bad blocks written as part of an envelope reaches a threshold (e.g., an "envelope window threshold," as described below), or when the number of bad blocks increases the size of the envelope beyond a threshold (the envelope window threshold), the media drive may shift the envelope from a first region of the storage medium to a second region of the storage medium, thereby avoiding defective regions on the storage medium, and reducing the number of bad blocks in the envelope. The blocks of the envelope already written to the storage medium may be erased. Any uneraseable blocks (or blocks whose erasure cannot be confirmed) are left on the storage medium, and the envelope is expanded to include them with the rest of the envelope that is re-written in a new position on the storage medium.

Media Drives

A media drive typically includes a transducer head for writing envelopes comprising blocks of information to a storage medium. For example, a tape drive (such as DLT or SDLT tape drives) may include at least one transducer head assembly having one or more magnetic heads for reading or writing blocks of data to a tape. The tape drive may also include a reel (e.g., a take-up reel) and a motor for driving the reel or reels. The tape drive may also include a controller for controlling the movement of the tape media within the drive, and for controlling the writing or reading of the information (e.g., blocks) to the tape. As mentioned above, the tape drive may also include logic (and components executing the logic) for formatting the information into an envelope of blocks so that it can be written to the tape. Examples of media drive controllers can be found in U.S. Pat. No. 6,067,481, the entirety of which is herein incorporated by reference in its entirety. In addition to a transducer head, the media devices described herein also typically include envelope writing logic, and components for executing the envelope writing logic.

Envelope Writing Logic

Figure 5A:
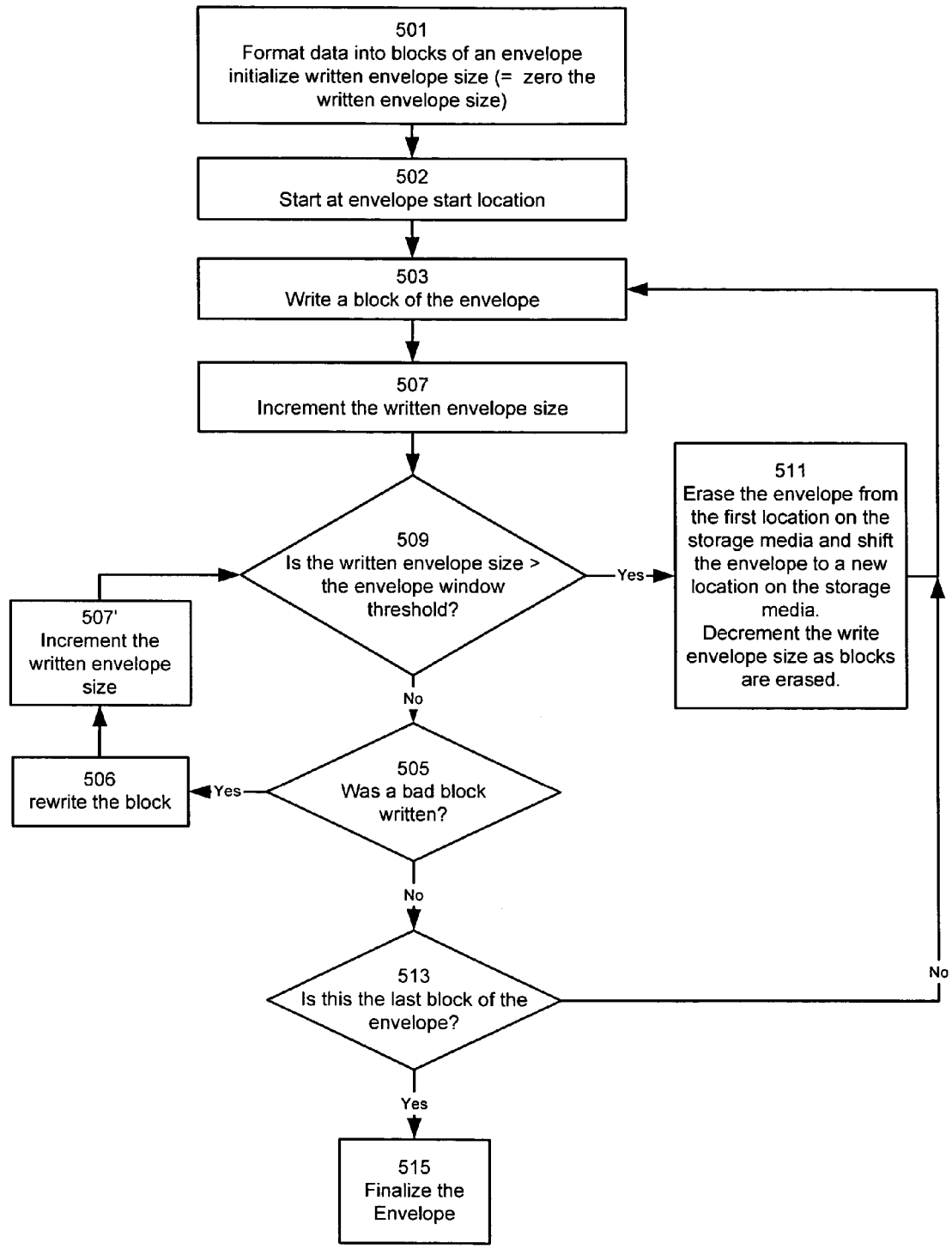
FIG. 5A shows one variation of envelope writing logic as described herein.

Envelope writing logic typically monitors the writing of blocks of information forming an envelope as it is written to a storage medium to determine when the envelope should be expanded or shifted to another region of the storage medium to avoid defects in the storage medium. For example, when the number or arrangement of bad blocks written to the storage medium as part of the envelope exceeds some threshold, the envelope writing logic causes at least a portion of the envelope to be rewritten elsewhere on the storage media. The envelope writing logic may also cause the portion of the envelope that has already been written to the storage medium to be erased, so that only one copy of the information in the envelope remains on the storage media. Erasing the old envelope from the storage media may prevent the old information from interfering with other read/write procedures, and may alleviate the need for additional steps to avoid the obsolete or bad information in the duplicated envelope. FIG. 5A illustrates one variation of envelope writing logic.

When erasing block of the envelope from the tape, some blocks may not be erasable or the media drive may not be able to confirm erasure. For example, either the read or the write head of the transducer head may not be able to make sufficient contact with a region of the tape, as described above. These ghost blocks will remain behind in a region that would otherwise be erased. Thus, the envelope writing logic may include these ghost blocks as part of the envelope. When the envelope is written to the storage medium (e.g., rewritten in a new region of the tape), the envelope is "expanded" to include these ghost blocks. Thus, when portions of the envelope cannot be erased, the version of the envelope written to the storage medium may include these ghost blocks.

Envelope writing logic may be used in conjunction with other media drive logic controlling the writing of information to the storage media. For example, the media drive may include logic to direct the formatting of blocks (e.g., data blocks, ECC blocks, metadata blocks) within an envelope and/or information within the blocks. As described above, in most media drives, a block that is erroneously transcribed is rewritten until it is accurately written, leaving the bad blocks ("ghost blocks") behind, to be avoided by the media drive. In general, the envelope writing logic monitors the writing of the envelope to the storage media. The envelope writing logic may monitor the number of bad blocks, the position (and/or the number) of bad blocks, or the total size of the envelope as the envelope is written to the storage medium. Thus, the envelope writing logic may continuously determine a parameter (such as a written envelope size) as the envelope is written, and compare this parameter to a threshold. When the threshold is exceeded, the envelope writing logic shifts the envelope to another region of the storage medium or expands the envelope into another region of the storage medium (e.g., when blocks for which erasure could not be confirmed are left on the storage medium). In some variations, the envelope writing logic is separate from the logic controlling the writing and re-writing of blocks by the media drive. For example, a tape drive may include a controller for writing and re-writing the blocks of an envelope to a tape media. In some variations, the envelope writing media is integrated with the logic that controls writing, verification and re-writing of blocks of information to a storage medium.

In FIG. 5A, the envelope writing logic monitors the number of bad blocks that are written as the envelope is written to the storage medium, and rewrites the envelope to a new region of the storage medium when the written envelope size exceeds a threshold value (e.g., the envelope window threshold). In this variation, the envelope writing logic begins monitoring after the media drive formats the envelope and starts writing 502. In this variation, the written envelope size counts the total number of blocks written as part of the envelope, as they are written. Thus, the written envelope size is initialized to zero (when zero blocks have been written). After each block is written, the envelope writing logic increments the written envelope size (e.g., by one).

Figure 6A:
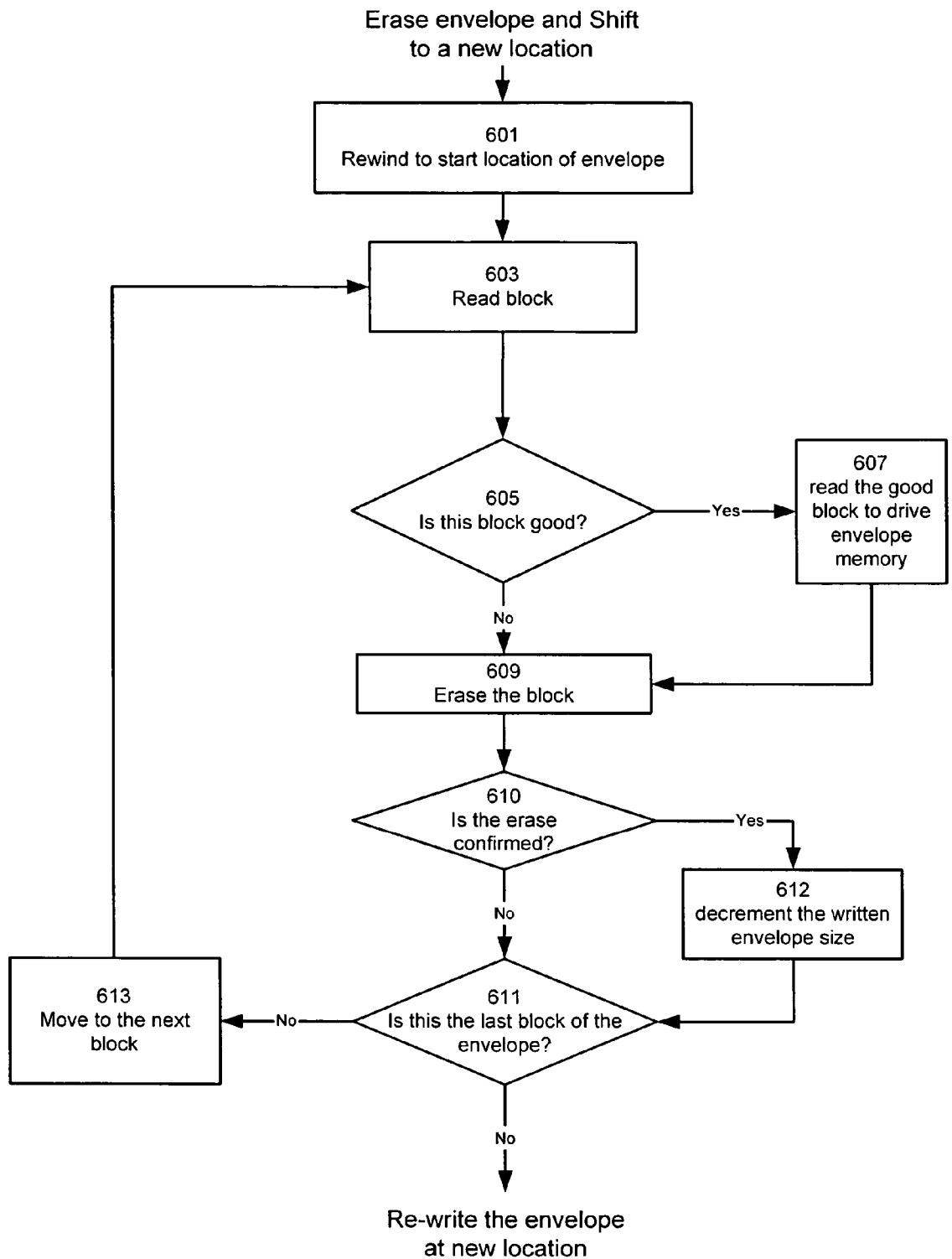
FIG. 6A shows one variation of envelope shifting/expanding logic that may be part of the envelope writing logic, as described herein.

The envelope writing logic also compares this written envelope size to the threshold value 509, referred to as the envelope window threshold. As described above, the envelope window threshold may be any threshold for the total number of blocks (including bad and any unerased blocks from previous attempts to write the envelope). For example, the envelope window threshold may be less than or equal to the number of blocks that may be held by the drive envelope memory, which stores the envelope for reading/writing/re-writing. If the written envelope size exceeds the envelope window threshold, the envelope writing logic may cause the blocks of the envelope that have been written to be read, trigger erase of the blocks, and cause the blocks to be rewritten in a new location. FIG. 6A gives one example of this process, which is described more fully below.

If the block that was written is a bad block 505, the media drive rewrites the block 506, and the written envelope size may be incremented 507. The envelope writing logic may then compare the written envelope size to the envelope window threshold, as before. If the envelope as written to the storage media is too large (e.g., contains too many bad blocks), the envelope may be expanded or shifted to a new region of the storage medium 511.

As described above, a bad block is typically a block of information that is not faithfully written by the writing head of the head assembly. For example, the media drive may read (e.g., validate) the block after (or concurrent with) writing the block to the media drive, and compare the block to the original (e.g., the block from the formatter or a memory of the media drive). As described above, when the written block does not match the original block, the written block is a bad block, and the block is re-written onto the storage medium. The envelope writing logic may determine (or may be informed by other portions of the media drive) when a bad block has been written 505.

Figure 5B:
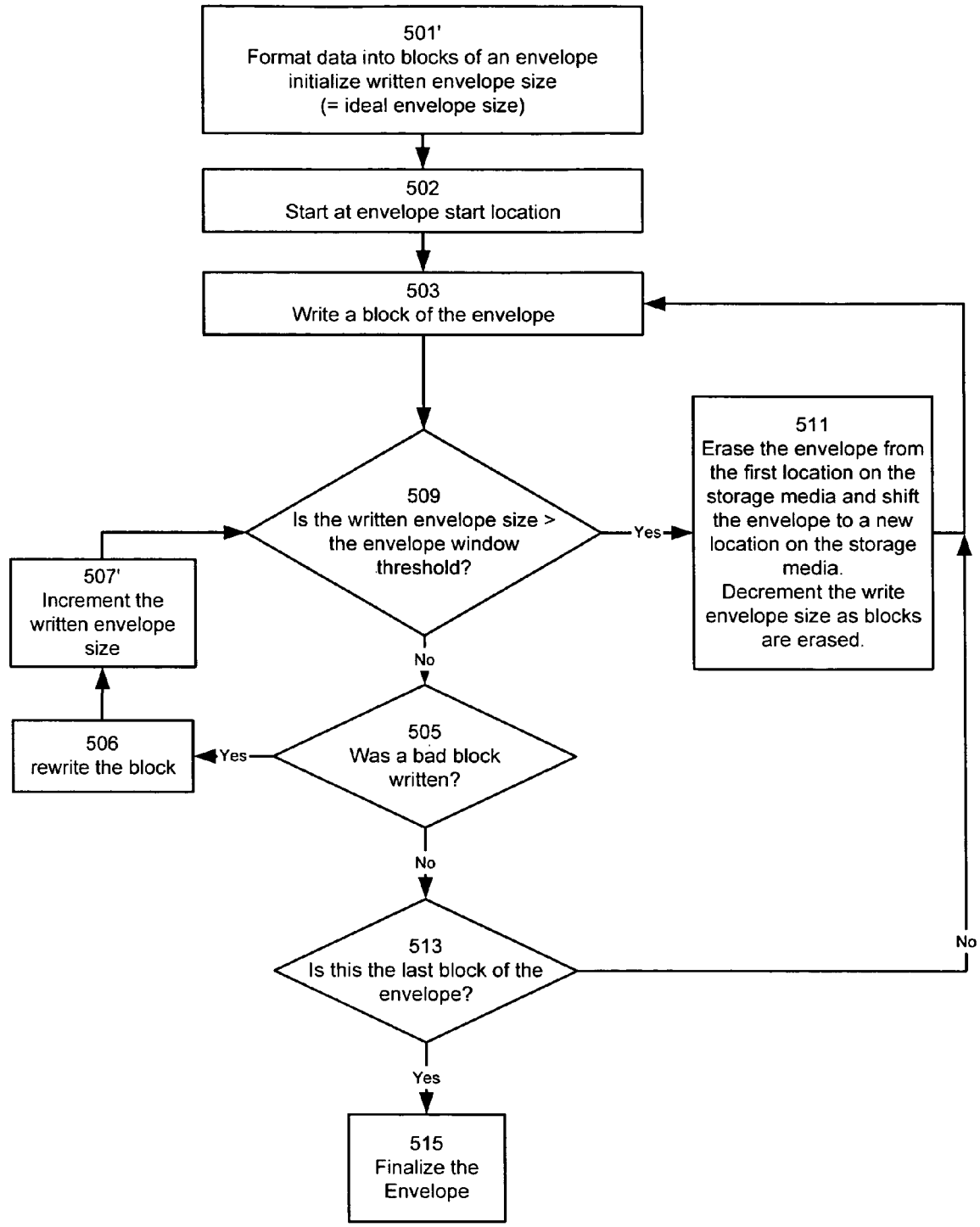
FIG. 5B shows another variation of envelope writing logic as described herein.

The written envelope size may be continuously updated as the envelope is being written to track the errors in the envelope written to the storage medium based on the size of the envelope. This marker may be a variable, a counter, a register, etc. In some variations, the written envelope size marker is incremented as a bad block is written (or as a block is re-written after detecting a bad write), as illustrated in FIG. 5B. In some variations, the written envelope size marker is incremented by a weighted value. Thus, the incremented value may be weighted to reflect the proximity of the bad block to another bad block, or to the number of times that the same block has been re-written.

The envelope writing logic may be compare the written envelope size to a threshold value to determine if the envelope should be shifted or expanded 509. An envelope window threshold may be set as the threshold value. Thus, when the bad blocks (e.g., the number or location of bad blocks) in an envelope being written to the storage medium exceeds the envelope window threshold, the media drive will rewrite the envelope in another location on the storage medium, and may trigger erase of the old version of the envelope (with the bad blocks) from the storage medium. As described above, in many existing media drives, when the number of bad blocks in an envelope exceeds a certain size (usually limited by the drive memory), a hard write error is declared. Expanding or shifting the envelope into a new location may prevent a hard write error, because the envelope may be rewritten without the bad blocks.

In some variations, the written envelope size marker that tracks bad blocks is a numerical value that may be compared to the envelope window threshold. Thus, the written envelope size marker may be a count of the number of bad blocks. In some variations, the written envelope size is not a simple count of the number of bad blocks, but may be the sum of weighted values. For example, the written envelope size may be incremented by a value that is greater than one for bad blocks that are adjacent (or close to) previous bad blocks. Likewise, the written envelope size may be incremented by a value that is less than one. In some variations, the written envelope size is initially set to the number of good blocks in the envelope, so that the number of bad blocks added to the envelope validity marker approximates an expected value of the final size of the envelope including the known bad blocks. In some variations, the written envelope size also includes the number of unconfirmed erasures. Erasure of a block may include any manner of removing, marking or overwriting a block. For example, a block may be "erased" by setting the ECC (error correction code) for the block to be false (e.g., by overwriting a portion of the block). In some variations, the block may be completely overwritten.

The media drive may therefore include logic (e.g., logic that may be included into the envelope writing logic) to verify or confirm that a block has been erased. For example, confirmation of erasure may be made when the block ECC is false for the erased block. Unsuccessful attempts to erase, mark or otherwise remove a block may result in the block not being removed (or not being able to confirm removal of the block) by the media drive. Too many unconfirmed erases may result in a fatal error for the drive attempting to read an envelope, since the size of the envelope may exceed the size of drive envelope memory, as already described. Thus, the envelope writing logic may includes these unconfirmed erases as part of the written envelope size when writing the envelope.

The envelope window threshold may reflect the threshold envelope size. For example, the envelope window threshold may be set to the size at which a hard write error would be declared, such as the maximum size of the envelope determined by the drive memory. As used herein, the "size" of the envelope may refer to the number of blocks in the envelope, or the memory size of the envelope (e.g., bits, etc.).

The error tolerance of the media drive may be adjusted by adjusting the envelope window threshold. For example, the larger the envelope window threshold, the more error tolerant the media drive is, and the smaller the envelope window threshold, the less error tolerant the media drive is. For example, if the envelope window threshold is compared with the size of the envelope written and the envelope window threshold is only slightly larger than the ideal size of the envelope (e.g., the size of the envelope without any bad blocks), the media drive is not very error tolerant compared to media drives having an envelope window threshold that is larger than the ideal size of the envelope. In some variations, the envelope window threshold is set to allow a percentage of bad blocks over the total number of good blocks (e.g., the envelope window threshold is set to permit 5% or 10%, 15%, 20%, etc., of the blocks of the envelope to be bad blocks). For example, the envelope window threshold may equal the ideal number of blocks in an envelope plus 5% of this total. For example, if an envelope ideally contains 1024 good blocks, an envelope window threshold can be set to any value greater than 1024, such as 1076 (for a 5% envelope window threshold), 1128 (for a 10% envelope window threshold), etc. In some variations, the envelope window threshold is a constant. In some variations, the envelope window threshold is user-adjustable or selectable.

FIG. 5B illustrates another variations of the envelope writing logic, in which the envelope writing logic monitors the number of bad blocks, including any unconfirmed erasures from previous attempts to write this envelope. Thus, in FIG. 5B, the written envelope size is incremented only after a bad block is detected and rewritten. In this example, the written envelope size is initialized to the size of an ideal envelope (e.g., the logical envelope size) 501', and the number of bad blocks is added to this. This is compared to the envelope written threshold, and the envelope written threshold indicates the maximum size (e.g., in blocks) of the envelope, as previously described.

Alternatively, if the written envelope size initialized to zero, the envelope window threshold may be set to a maximum number of bad blocks. The maximum number of bad blocks may be determined by a percentage of the total number of good blocks. For example, if 5% or 10%, 15%, 20%, etc., of the blocks are allowed to be bad blocks, and the envelope has 1024 blocks, the envelope window threshold may be set to 51.

In some variations, the envelope writing logic monitors only the size of the envelope as it is being written to the storage medium, and does not monitor the number or locations of bad blocks specifically. The size of the envelope (e.g., the total number of blocks written) may be held in the written envelope size marker. FIG. 5A is an example of this. In FIG. 5A, the envelope writing logic compares the size of the envelope being written (stored in the written envelope size 507) to an envelope window threshold 509.

In FIGS. 5A and 5B, the envelope writing logic causes the envelope to be expanded or shifted from an initial region (or first region) of the storage medium to a new region (e.g., second region) when the written envelope size exceeds the threshold set by the envelope window threshold 511. As described in more detail below, the envelope writing logic may select the new location for the envelope on the storage medium, and may trigger the erase the envelope from the first region 519. The envelope writing logic may then repeat the process 503 of monitoring the number or location of bad blocks, and shifting or expanding the envelope if the (reset) written envelope size exceeds the threshold.

The envelope is expanded when there are blocks that could not be confirmed erased. Since these unconfirmed erasures will remain on the storage medium, and will be included in the envelope, the envelope has been "expanded" to include these unconfirmed erasures in the first (or later) region, plus the re-written portion of the envelope in the second (or later) region. If there are no unconfirmed erasures, then the envelope is truly "shifted" to the second (or later) region.

FIG. 6A illustrates one way in which the envelope writing logic may shift or expand the envelope from a first region of the storage medium to a second region of the storage medium. FIG. 6A describes envelope shifting/expanding logic, which may be part of the envelope writing logic. The envelope shifting/expanding logic described in FIG. 6A may be used with FIG. 5A. Any appropriate method of expanding or shifting the envelope may be used. For example, in FIG. 6A, the envelope writing logic records the location of the last block written (the last bad block) (not shown). In some variations, the location of the last block written is not recorded. The storage media (e.g., a tape media) may then be rewound to the start of the envelope (the envelope start location, which may include any unconfirmed erasures) 601, so that the envelope may be erased before writing the envelope to the new location. The good blocks from the envelope are then read by the head assembly (e.g., into memory, such as a drive envelope memory) so that they may be written to the new location 603. Thus, the media drive may include a memory for holding the envelope blocks. Reading the portion of the envelope already written to the storage media may be particularly important in variations of the tape drive in which the blocks of the envelope are not retained after correctly writing them to the storage media. The media drive may first determine if the block being read is a good block 605 (e.g., by examining the ECC, or other markers), and only read the good blocks in to the memory 607.

The envelope writing logic then causes the old block to be erased 609. For example, the block may be erased by overwriting the block, remove the block, or by otherwise marking the block, as previously described. After erase, the erasure may be confirmed 610 (e.g., using a read-after-write protocol) and if the erasure can be confirmed, the written envelope size can be decremented (e.g., subtracting successfully erased blocks). This reading and erasing process can be repeated 613 until the entire envelope is erased (e.g., until the erased block is the last block of the original envelope) 611. At the end of the expanding/shifting procedure, the written envelope size is set to the number of any unconfirmed erases, and the storage media is positioned at the last position of the previously written (now erased) envelope, and ready to rewrite the envelope.

The envelope writing logic then re-writes the envelope at a new location that is in a different region of the envelope than the original starting location. For example, when the storage media is a linear tape, the envelope writing logic chooses a new position that is further down the tape media (the unwritten region of the tape media). Any appropriate method may be used to select the new starting location for the envelope. In general, the envelope writing logic writes the envelope to a region of the storage media that bypasses defective regions of the storage media (e.g., the region that triggered the envelope writing logic to shift the position of the envelope). Thus, the envelope writing logic may pick a new writing region of the envelope so that the envelope does not overlap with the region of the storage media that the envelope originally spanned. In some variations, the envelope writing logic shifts the envelope by one or more envelope lengths, or one or more envelope window thresholds. For example, in some variations, the envelope writing logic shifts the envelope two envelope window thresholds. The new distance or location refers to the distance along the storage medium. For example, the distance may refer to the distance along the storage medium that would be spanned by blocks written to the storage medium.

The envelope is shifted or expanded by setting the start location for the envelope to a new stating location, and then rewriting the envelope at that starting location. The envelope writing logic may therefore set the start location to be the new starting location, and may communicate this new location to the rest of the media drive. Thus, the media drive (e.g., the envelope writing logic) may update the directory and any information about the storage media with this new location.

Figure 6B:
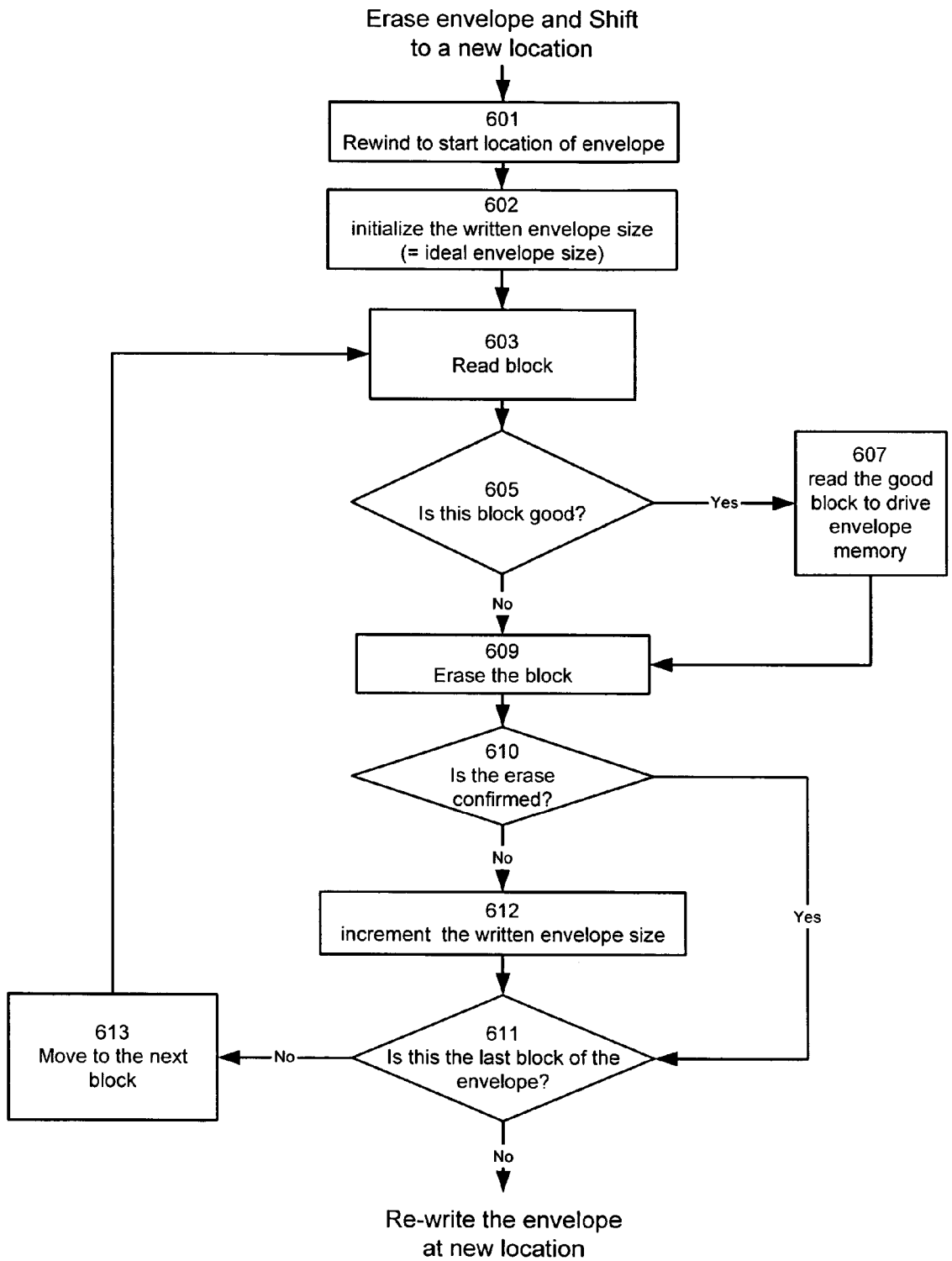
FIG. 6B shows another variation of envelope shifting/expanding logic that may be part of the envelope writing logic, as described herein.

FIG. 6B illustrates another example of envelope expanding/shifting logic. This envelope expanding/shifting logic may be part of the envelope writing logic as illustrated in FIG. 5B. The envelope expanding/shifting logic described in FIG. 6B is similar to that shown in FIG. 6A, except that the written envelope size is handled differently. In FIG. 6A, the written envelope size is initialized before erasing any of the envelope. The written envelope size may be initialized to the ideal size (the size of the logical envelope) after the storage media is rewound to the start of the envelope. The start of the envelope may be the initial start site (e.g., including any previously erased portions of the envelope that may have blocks that are unconfirmed erasures from earlier attempts to re-write the envelope). Thus, during the erasure and expanding/shifting process, the written envelope size is incremented when an unconfirmed erasure of a block occurs. Thus, after the expanding/shifting process is complete, the written envelope size is one again properly initialized.

The envelope writing logic may be executed by any appropriate structure or devices as part of the media drive. For example, the envelope writing logic may comprise software (e.g., executable commands) that is run on hardware (e.g., microprocessors, integrated circuits, etc.), or a combination of hardware and software. The envelope writing logic may also include one or more memories (e.g., digital memories, EPROM, ROM, RAM, etc.), and controllers (e.g., for controlling a tape reel, a tape drive controller 103, etc.). The envelope writing logic may also include outputs for reporting or storing the activity of the envelope writing logic. For example, the envelope writing logic may communicate with a central processor of the media drive or a media drive system. In some variations, the envelope writing logic includes inputs for communicating with other portions of the media drive or media drive system. For example, the envelope writing logic may receive inputs indicating that a bad block was written.

The envelope writing logic described above may also be used as part of an information storage system for storing information on a storage medium. For example, the information storage system can include a media drive (such as a tape driver, etc.) including envelope writing logic. In some variations, the envelope writing logic is not part of the media driver, but interacts with the media drive (e.g., controlling the media driver, and/or receiving information from the media driver). The information storage system may also include any appropriate component for storing an/or retrieving information from the storage medium. For example, the information storage system may include a motor operable to position the storage medium with respect to the transducer head.

Methods of Writing Information to a Tape Media

Also described herein are methods for writing information to a storage media, such as a tape media. For example, the method of writing envelopes of information to a tape media may include the steps of monitoring the writing of an envelope of information to a tape media in a first region of the tape media. The step of monitoring the writing of the envelope may include a step of detecting the writing of a bad block of information or that a block is being re-written because it was not written correctly. In some variations, the step of monitoring the writing of an envelope of information includes a step of receiving notification that a bad block has been written, or that a block is being re-written (e.g., from other portions of the tape drive or other components of the tape drive system). Monitoring the writing of an envelope of information may also include tracking the number of bad blocks, or the location (or pattern) of bad blocks that are written to the envelope. For example, bad blocks may be tracked by incrementing a written envelope size marker as the envelope is written to the tape media, as described above.

If the number of bad blocks written to the storage media as part of the envelope (of the size of the envelope or the locations of the bad blocks) exceeds some threshold (e.g., the envelope window threshold), the method of writing information to a storage media may cause the envelope to shift to a different region of the storage media. In some versions, the step of shifting the envelope to a different region of the storage media may be triggered by a declaration that the envelope is 'bad', meaning that the number of bad blocks in the envelope has exceeded the threshold. Thus, the method may include a step of declaring an envelope as a bad envelope. The threshold may be the envelope window threshold, as described above. In some variations, the size of the envelope indicates when the number of bad blocks written as part of the envelope exceeds the threshold. When referring to "bad blocks" that are part of the envelope, it should be apparent that the bad blocks are not necessarily considered part of the information in the envelope. The bad blocks are typically part of the envelope that is written to the storage media because the region of the storage media comprising the envelope includes these blocks.

The step of declaring the envelope as a bad envelope may be equivalent to declaring an envelope write error (e.g., a hard write error). For example, an envelope write error may be declared when the size of the envelope exceeds some predetermined size (e.g., the size of a memory of the media drive). Thus, in some variations, the step of monitoring the writing of an envelope includes the step of monitoring the size of the envelope. Thus, the method may not monitor number and location of bad blocks within the envelope, but only the total size of the envelope.

The envelope may be shifted to any appropriate location of the storage media from the initial location, as previously described. In some variations, the method includes a step of determining a new location on the storage media that is different from the initial location. For example, in linear tape media, the step of determining a new location includes determining a new location that is downstream from the initial location of the envelope on the storage media. In some variations, the new location overlaps with the original region of the storage media on which the envelope was written. In some variations, the new location does not overlap with the original region of the storage media that the envelope was written. In some variations, the new location is separated from the original region by a distance grater than one envelop window threshold.

A method for writing information to a storage media as described herein may also include a step of erasing the portion of the envelope that was already written to the storage media, so that only one copy of the envelope (or a portion of the envelope) is present on the storage media. The step of erasing the portion of the old envelope may be performed either before or after the step of shifting the envelope and writing it to a different region of the storage media. In some variations, the portion of the envelope that was written to the storage media (e.g., the good blocks of the envelope that were written) may also be read from the storage media before (or as) they are erased from the storage media.

Figure 7A:
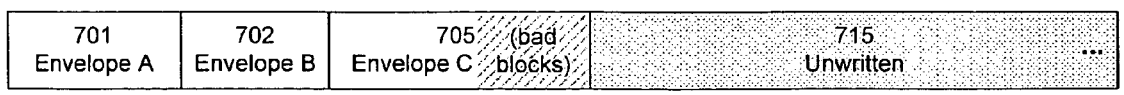
FIGS. 7A, 7B, 7C and 7D illustrate methods of shifting an envelope of information to avoid defective regions of the storage media tapes as described herein.
Figure 7B:
Figure 7C:

FIGS. 7A-7D illustrates a method of writing information to a storage media, shown as a linear tape media. In FIG. 7A, the storage media 700 has two complete envelopes, envelope A 701 and envelope B 703. In FIGS. 7A-7C, envelope A is larger than envelope B, because envelope B includes more bad blocks than envelope A. However, envelope B does not include is not larger than the threshold (e.g., the envelope window threshold) despite having some bad blocks. In FIG. 7A, Envelope C 705 is being written, and includes bad blocks. These bad blocks may arise because (for example), the media drive is attempting to write envelope C 705 to a defective region of tape media. When the size of envelope C 705 exceeds the envelope window threshold, the envelope is erased and rewritten at a new region of the storage media, as shown in FIG. 7B.

In FIG. 7B, envelope C 705 has been erased from the storage media 711. The blocks of envelope C (the good blocks) are then written to another region of the linear tape 700, as shown in FIG. 7C. Thus, FIG. 7C shows that the partial copy of envelope C written immediately after envelope B has been erased 711, and shifted to a new region of the linear tape 705" downstream of the original location. The new location of envelope C is separated from the old location of envelope C by the erased region 711 and an additional region of the tape that is unwritten 715'. Skipping additional space between the erased region and the new start position may help avoid additional bad blocks, particularly when the region of the linear tape is defective. As envelope C is rewritten to the new location, the entire envelope writing process may be repeated and may cause further shifting down the linear tape. Once envelope C 705" has been completely written to the storage media 700, another envelope (e.g., envelope D) may be written in the adjacent unwritten region 715". In this example, all of the blocks of the envelope were successfully erased. However, when blocks cannot be confirmed erased, the envelope may be expanded, as shown in FIG. 7D.

Figure 7D:
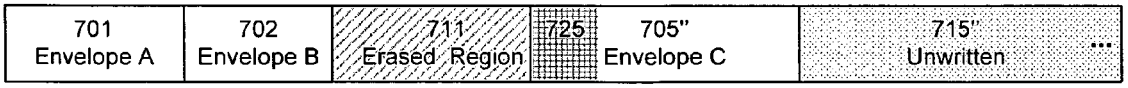

In FIG. 7D, the erased region 711 includes a region of unconfirmed erasures 725. This region is included as part of the envelope C envelope, as described above. Thus, envelope C has been expanded to include the unconfirmed erasures in this region Although the present invention has been described in conjunction with particular aspects, it will be appreciated that various modifications and alterations may be made by those skilled in the art without departing from the spirit and scope of the invention. The invention is not to be limited by the foregoing illustrative details.

What is claimed is:

1. A tape media drive comprising:
   a drive envelope memory operable to hold an envelope, the envelope comprising blocks of information;
   a transducer head for writing the envelope on a tape media;
   envelope writing logic operable to determine a written envelope size as the envelope is written to a first region of the tape media, and further operable to cause the envelope to be erased from the first region of the tape media and rewritten at a second region of the tape media if the written envelope size exceeds an envelope window threshold, the envelope window threshold equal to a size of the drive envelope memory.

2. The tape media drive of claim 1, further comprising a motor for controlling the position of the tape media.

3. The tape media drive of claim 1, wherein the written envelope size is the number of blocks of the envelope written to the tape media.

4. The tape media drive of claim 1, wherein the written envelope size is the number of blocks of the envelope written to the tape media plus the number of blocks that were not confirmed erased.

5. The tape media drive of claim 1, wherein the envelope writing logic is operable to cause the erased portion of the envelope to be rewritten at a second region of the tape media adjacent to the first region of the tape media.

6. The tape media device of claim 1, wherein the envelope writing logic is operable to monitor the number of unsuccessful erasures for the envelope being written to the tape media.

7. An information storage system for storing information on a storage medium, the system comprising:
   a drive envelope memory operable to hold an envelope, the envelope comprising blocks of information;
      a transducer head to read or write to the storage medium;
      a motor operable to position the storage medium with respect to the transducer head; and
      a controller operable to control the transducer head and the motor, the controller comprising envelope writing logic operable to determine a written envelope size as an envelope of information is written to a first region of the storage medium, and further operable to cause the envelope of information to be erased and rewritten at another location on the storage media if the written envelope size exceeds an envelope window threshold, the envelope window threshold equal to a size of the drive envelope memory.

8. The system of claim 7, wherein the written envelope size is the number of blocks of the envelope written to the storage medium.

9. The system of claim 7, wherein the written envelope size is the number of blocks of the envelope written to the storage medium plus the number of blocks that were not confirmed erased.

10. A method of writing information to a tape media, the method comprising:
    determining a written envelope size as an envelope comprising blocks of information is written to a first region of the tape media;
    triggering an erase of the envelope from the first region of the tape media when the written envelope size exceeds an envelope window threshold; and
    rewriting the envelope blocks to a second region of the tape media when the written envelope size exceeds the envelope window threshold, the envelope window threshold equal to a size of the drive envelope memory.

11. The method of claim 10, wherein the written envelope size is the number of bad blocks written to the tape media plus the number of blocks that were not confirmed erased.

12. The method of claim 10, wherein the step of triggering an erase of the envelope further comprises:
    moving the tape media to the beginning of the first region;
    reading and erasing the blocks of the envelope written in the first region; and
    confirming if each block was erased.

13. The method of claim 10, further comprising:
    advancing the tape media to the second region of the tape media; and
    writing the information in the envelope to the second region of the tape media.

14. The method of claim 13, wherein the step of advancing the tape media to the second region comprises advancing the tape media so that the second region does not overlap with the first region.

15. The method of claim 13, wherein the step of advancing the tape media to the second region comprises advancing the tape media so that the second region is adjacent to the first region.

* * * * *